United States Patent
Minami et al.

[11] Patent Number: 5,910,470
[45] Date of Patent: Jun. 8, 1999

[54] GREASE TO BE SEALED IN BEARING

[75] Inventors: Masami Minami, Kuwana; Takao Yoshimatsu; Hiroki Iwamatsu, both of Kobe; Takahiro Koremoto, Iwata, all of Japan

[73] Assignee: NTN Corporation, Osaka, Japan

[21] Appl. No.: 08/790,651

[22] Filed: Jan. 29, 1997

[30] Foreign Application Priority Data

Jan. 30, 1996 [JP] Japan ................................. 8-014299

[51] Int. Cl.$^6$ .............................................. C10M 145/22
[52] U.S. Cl. .......................................... 508/468; 508/552
[58] Field of Search ................................ 508/466, 552, 508/468; C10M 145/22, 145/16

[56] References Cited

U.S. PATENT DOCUMENTS

| | | | |
|---|---|---|---|
| 4,548,725 | 10/1985 | Bridger | 508/468 |
| 4,877,557 | 10/1989 | Kaneshige et al. | 508/468 |
| 5,516,443 | 5/1996 | Jackson | 44/424 |
| 5,554,200 | 9/1996 | Brod et al. | 44/393 |

FOREIGN PATENT DOCUMENTS 2080493   3/1990   Japan .

*Primary Examiner*—Jacqueline V. Howard
*Assistant Examiner*—Cephia D. Toomer
*Attorney, Agent, or Firm*—Wenderoth, Lind & Ponack L.L.P.

[57] ABSTRACT

A grease to be sealed in bearings which shows good lubricating properties within a wide temperature range from low to high temperatures, whereby it can prevent bearing noise while it is cold, and maintain its good properties including excellent high-temperature durability for a long period of time. The grease contains a base oil made up of a synthetic hydrocarbon oil and an ester synthetic oil having eight or more ester groups arranged in a comb-like fashion on one side of an oil chain molecule made up of eight of more carbon atoms, as expressed by Formula below, the ratio of contents in weight of the synthetic hydrocarbon oil and the ester synthetic oil being 0.65–0.75:0.35–0.25, and 5–20 wt % of a urea thickening agent. The grease may further contain 0.1–10 wt % dithiophosphate as an extreme pressure agent. The grease may be used as grease to be sealed in a ball bearing for supporting a pulley engaging belts for transmitting automotive engine torque to prevent noise immediately after the engine is started.

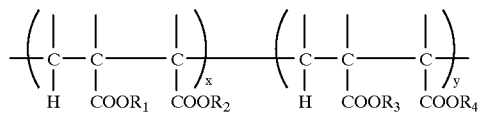

(where $R_1$–$R_4$ are alkyl groups, and x and y are integers greater than 1).

8 Claims, 1 Drawing Sheet

GREASE TO BE SEALED IN BEARING

BACKGROUND OF THE INVENTION

FIELD OF THE INVENTION

This invention relates to a grease to be sealed in a bearing, and specifically a grease to be sealed in a ball bearing to be mounted in an automotive pulley for which high cold resistance and heat resistance are required.

DESCRIPTION OF THE RELATED ART

It is known that the performance and longevity of a rolling bearing in which a grease is sealed by a rubber or metal shield depend largely on the properties of the grease sealed. Such grease-sealed rolling bearings include grease-sealed ball bearings used to support belt driving pulleys mounted near an automotive engine.

Such pulleys engage and drive a timing belt and other belts for transmitting engine torque to engine auxiliaries such as an alternator. They are used to increase the lap angle of the belt and to keep the belt tension at a suitable level.

In modern automobiles, in order to generate high power with high efficiency while keeping weight light and size compact, their engines are revolved at higher speeds, and smaller, lighter engine auxiliaries and pulleys are used.

In order to transmit engine torque to engine auxiliaries with the highest efficiency through such small pulleys, these pulleys are formed with a plurality of belt engaging grooves and the belts are engaged in these grooves with high tension. Bearings for supporting such pulleys have to be capable of withstanding high revolving speeds and high loads.

As shown in FIG. 1, an automotive pulley 1 has a double-cylindrical portion comprising an outer cylindrical wall 1$a$ for engaging a belt (not shown) and an inner cylindrical wall 1$b$ in which a ball bearing 2 is mounted. It is formed by pressing a steel plate. The ball bearing 2 has its outer ring 3 fitted in the inner wall 1$b$ of the pulley and its inner ring 4 fitted on a fixed shaft (not shown).

The ball bearing 2 has a grease sealed therein by seals 7 provided at both ends thereof to lubricate a retainer 5 and balls 6 rotatably guided by the retainer 5.

The life of a grease sealed in a ball bearing used to support a belt-engaging pulley is usually shorter than the life of the bearing itself, so that the life of the bearing is greatly influenced by the grease sealed therein. It is therefore highly desirable to use a grease that shows high durability at elevated temperatures. As its base oil, a conventional grease to be sealed in bearings typically uses a mineral oil, synthetic hydrocarbon oil, polyol ester oil, alkyldiphenyl ether oil, silicone oil, or fluorine oil. Thickening agents such as lithium soap, lithium complex, polyurea or fluororesin are added to the base oil.

Such a grease-sealed bearing is mounted on a pulley for engaging belts for transmitting engine torque. If such a bearing is used in a cold environment, it tends to produce peculiar hoot noise. For example, the bearing may produce such hoot noise if the car is driven in a sub-zero environment in winter, though it also depends on how the pulley is mounted and/or driving conditions.

Such hoot noise typically last only a minute or so after engine start and fade away thereafter, so that it is difficult to experimentally reproduce such noise continuously. Thus, it is not yet clearly known what causes noise of the bearing.

Since the bearing hoots only while it is cold, it would be possible to prevent bearing noise by using a grease that shows high lubricating properties at low temperatures. But such a grease is typically low in viscosity, so that when the bearing is heated to high temperatures by the engine after engine start, such a grease cannot form a continuous oil film. This lowers the durability of the bearing.

An object of this invention is to provide a grease to be sealed in bearings which shows good lubricating properties within a wide temperature range whereby it can prevent noise while it is cold, i.e. immediately after the engine is started, maintains its good properties including excellent high-temperature durability for a long period of time, and can prolong the life of the bearing.

SUMMARY OF THE INVENTION

According to this invention, there is provided a grease to be sealed in a bearing comprising a base oil made up of a synthetic hydrocarbon oil and an ester synthetic oil having eight or more ester groups arranged in a comb-like fashion on one side of each oil chain molecule made up of at least eight carbon atoms, the ratio of contents in weight of said synthetic hydrocarbon oil and said ester synthetic oil being 0.65–0.75:0.35–0.25, and 5–20 wt % of a urea thickening agent.

The grease further contains 0.1–10 wt % of dithiophosphate as an extreme pressure agent.

This grease may be sealed in a ball bearing for supporting a pulley that engages belts for transmitting automotive engine torque.

This grease, having a dripping point of 250° C. or higher, is sufficiently durable at high temperatures. The ester synthetic oil, due to its following functions, helps form a uniform oil film quickly on the metal surface, thereby reducing noise of the bearing.

The ester synthetic oil used in this invention has ester groups arranged in a comb shape on one side of a sequence of carbon atoms forming an oil chain molecule so that all the ester groups adsorb to the metal surface. Such ester synthetic oil is highly compatible. A uniform oil film can be formed quickly on the metal surface.

In contrast, pentaerythritol ester, which is used as the base oil of a conventional grease, has ester groups arranged to surround each carbon atom, as shown by Formula 1. In this arrangement, only one of the four ester groups surrounding each carbon atom can adsorb to the metal surface. The remaining three cannot adsorb to the metal surface.

[Formula 1]

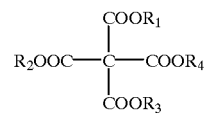

(where $R_1$–$R_4$ are alkyl groups)

Other features and objects of the present invention will become apparent from the following description.

DETAILED DESCRIPTION OF THE PREFERRED EMBODIMENT

Figure 1:
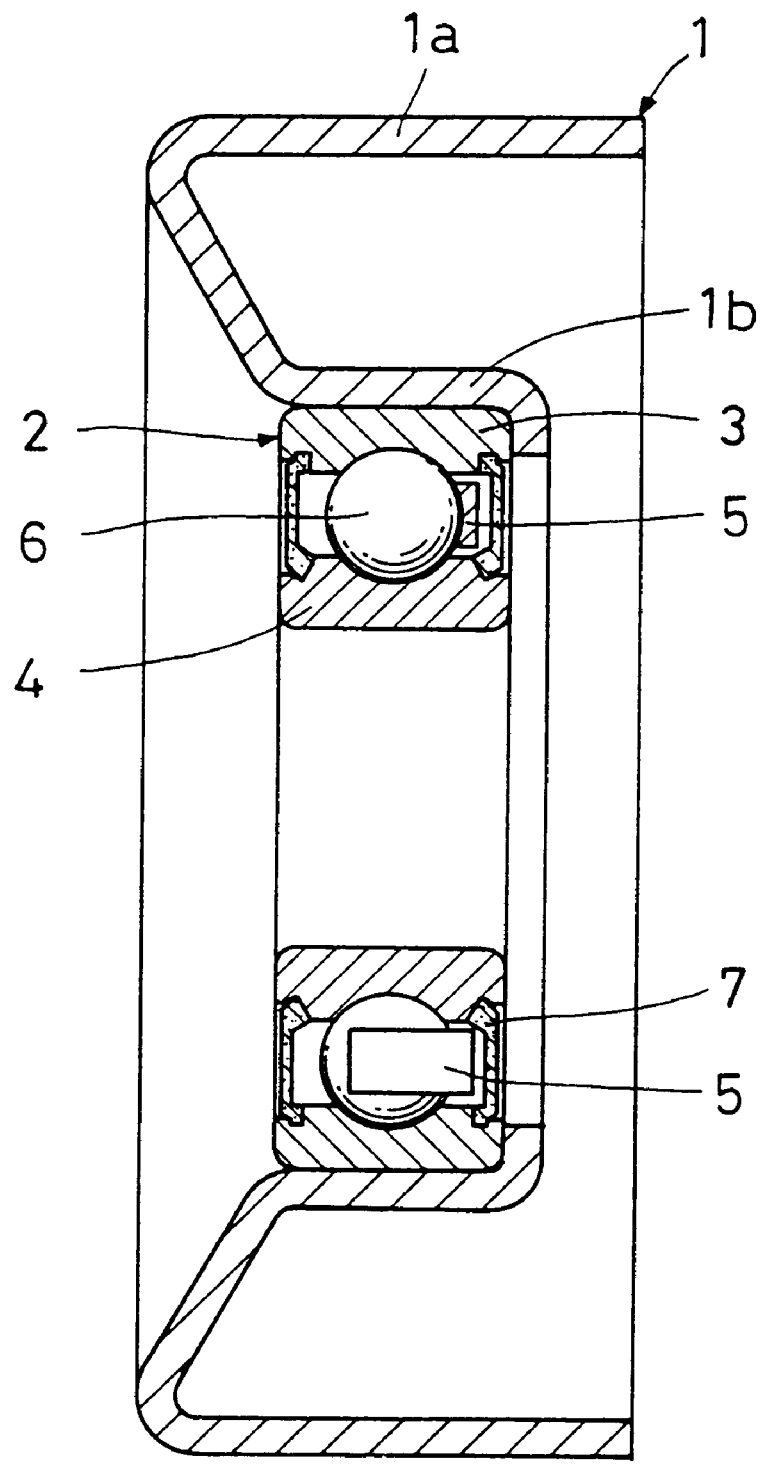
FIG. 1 is a ball bearing mounted in a pulley of an automotive engine.

The synthetic hydrocarbon oil as a component of the base oil of the grease according to this invention may be poly α-olefin oil, polybutene, or olefin copolymer. Preferably, it should have a viscosity (at 40° C.) of 20–100 mm²/s and, for safety's sake, a flashpoint of 220° C. or higher.

It is formed by attaching hydrogen atoms to terminal double bonds of an oligomer formed by low-polymerizing α-olefin and may be one expressed by Formula 2 below. Polybutene is a kind of α-olefin and can be manufactured by polymerizing a starting material containing isobutylene as a main component, using aluminum chloride as a catalyst. Polybutene may be used as it is, or with hydrogen added.

[Formula 2]

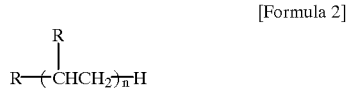

(where R is alkyl group, and n is 1–6)

The ester synthetic oil used in this invention is manufactured by esterifying a dibasic copolymer of α-olefin expressed by Formula 3 below so that eight or more ester groups are arranged like a comb on one side of eight or more carbon atoms forming an oil chain molecule.

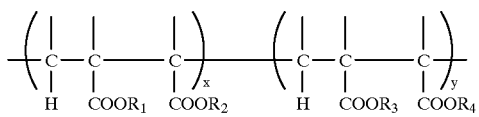

(where $R_1$–$R_4$ are alkyl groups, and x and y are integers greater than 1)

Preferably, the ester synthetic oil should have a molecular weight of 1000–3000. Good results were achieved when its viscosity was 10–245 mm²/s at 40° C. For a grease to be sealed in a ball bearing for an automotive pulley, an oil having a flashpoint not less than 220° C. should be selected for higher safety.

The base oil should contain the synthetic hydrocarbon oil and ester synthetic oil in the weight ratio of 0.65–0.75:0.35–0.25. If the content of the synthetic hydrocarbon oil in the base oil is below this level, the grease will not reveal expected properties at low temperatures. If higher than the above level, heat resistance of the grease will not be sufficient.

The urea thickening agent used in the present invention may be a known urea compound such as expressed by Formula 4 below. It is a linear polyurea compound that separates out when amines and diisocyanates are polyaddition-reacted in the base oil. The diisocyanate represented by $R_2$ may be 4, 4'-diphenylmethane diisocyanate or tolylene diisocyanate. The amines represented by $R_1$ and $R_3$ in the formula may be a combination of any two of alicyclic amines, aromatic amines and aliphatic amines such as toluidine, cyclohexylamine and stearylamine. Good results are obtained when aliphatic amines are used.

[Formula 4]

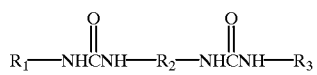

(where $R_1$ and $R_3$ are monovalent groups containing amines such as toluidine, cyclohexylamine or stearylamine, and $R_2$ is a bivalent group comprising diisocynate such as 4, 4'-diphenylmethane diisocyanate or tolylene diisocyanate)

The content of such urea thickening agent in the grease is preferably 5–20 wt %. If this content is less than 5 wt %, the grease will be so low in viscosity and will leak easily. Such a grease cannot be sealed in a bearing. If higher than 20 wt %, the grease will solidify with its density being 200 or less. Such a grease is practically useless as a grease to be sealed in bearings.

Antioxidants, rust preventives, extreme pressure agents and oiliness improvers may be added in such amounts that they will not lessen the expected advantages of the invention.

Typical extreme pressure agents include zinc dithiophosphate (ZnDTP). ZnDTP forms a rigid film by reacting with a metal surface, thereby reducing wear of raceways and rolling elements. Such extreme pressure agent helps form a uniform oil film on the metal surface, and thus reduce the production of abnormal noise due to oil film depletion. For this purpose, ZnDTP should be added by 0.1–10 wt %.

EXAMPLES

Tables 1 and 2 show the materials used in the Examples of the invention and Comparative Examples and their contents. Abbreviations for these materials are shown below.

The base oil viscosity was measured under JIS K2220.5.19 at 40° C.

(1) poly α-olefin synthetic hydrocarbon oil (viscosity 40.6)[PAO-a]

(2) poly α-olefin synthetic hydrocarbon oil (viscosity 30.5)[PAO-b]

(3) poly α-olefin synthetic hydrocarbon oil (viscosity 46.0) [PAO-c]

(4) complex ester oil (expressed by Formula 3, where $R_1$–$R_4$ are all alkyl groups and x≧2 and y≧2)[ester oil-1]

(5) polyol ester oil[mineral oil]

(6) paraffin mineral oil

Examples 1–3 and Comparative Examples 1–3, 5 and 6

Base oils as shown in Tables 1 and 2 were prepared. Isocyanate was dissolved in half of each base oil, and monoamine was dissolved in the remaining half portion. The half portions were then mixed together and agitated for a half hour at 160–170° C. to separate out a urea compound in the base oil. The base oil was then cooled, and after adding 5 wt % of a mixture of antioxidants and rust preventives and anti-wear additives, it was homogenized in a mixer. An intended grease was thus obtained.

Comparative Examples 4

A grease was prepared in exactly the same way as in Comparative Example 1, except that polyol ester oil was used as the base oil, and that, instead of a urea thickening agent, lithium stearate, a kind of lithium soap, was used. Specifically, a stearic acid was added to a half portion of the base oil, the half portion was heated, lithium hydroxide was added for saponification, and the half portion was dehydrated by heating. The lithium soap obtained or the first half portion of the base oil was dispersed in the remaining half portion of the base oil, and the mixture was cooled.

The greases thus obtained were tested for the following properties. The results are shown in Tables 1 and 3. Greases of Example 1 and Comparative Example 1 were further tested for their ability to suppress noise while the bearing is cold (test ). The results are shown in Table 4.

(a) density: measured under JIS K 2220.5.3

(b) degree of oil separation: measured under JIS K 2220.5.7

(c) bearing torque: 1.79–1.81 g of each of the greases of Examples and Comparative Examples was charged in a bearing 6204, non-contact iron seals were mounted on both sides of the bearing to seal the grease, the bearing was rotated at 3600 rpm under a 39N thrust load, and the bearing torque was measured at room temperature.

(d1) cold-time noise measurement ①: 0.85–0.95 g of each of the greases of Examples and Comparative Examples was charged in a bearing 6203, rubber contact seals were mounted on both sides of the bearing to seal the grease, the bearing was set in a housing, the housing was placed in a low-temperature (−40° C.) tank, sufficiently refrigerated, and mounted to a bearing rotator provided in an environment kept at room temperature (bearing testi temperature being around −30° C.), the bearing inner ring was rotated at 2000 rpm under a thrust load of 1.96N, and any noise produced by the bearing was checked by hearing.

(d2) cold-time noise measurements ②: 0.85–0.95 g of the grease of Example 1 or Comparative Example 1 was charged in a bearing 6203 with 0.02 mm or zero bearing clearance, rubber contact seals were mounted on both sides of the bearing to seal the grease, the bearing was mounted in a pulley of the type shown in FIG. 1, the pulley was set in a low-temperature (−27° C.) tank, refrigerated, and mounted to a bearing rotator provided in an environment kept at room temperature (bearing test temperature being around—20° C.), the bearing was rotated at 2700 rpm under a 127N radial load, and any noise produced by the bearing was checked by hearing. The results are shown in Table 4. This test was repeated 40, 70 and 100 times according to test conditions. The number of the tests in which noise was produced was counted, and the probability (%) of noise being produced in each test was given by (the number of the tests in which noise was produced/the number of the entire tests)×100

(e) rust proofness test: This test is a stricter version of the rust proofness test under ASTM D 1743. In this test, 1.9–2.1 g of each grease specimen was charged in a tapered roller bearing 30204, and the bearing was run in at 1800 rpm under a 98N thrust load for a minute, immersed in 1% salt water for 10 seconds, put in a decicator and left therein for 48 hours at 40° C., and the degree of rusting was observed. To evaluate the degree of rusting, the outer race of each bearing was circumferentially and equally divided into 32 sections, and the number of sections where rust was observed was counted. The numbers shown in Table 1 are the averages of four tests.

(f) endurance test when the bearing outer ring is rotated: 0.85–0.95 g of each grease specimen was charged in a bearing 6203, rubber contact seals were mounted on both sides of the bearing to seal the grease, the bearing was mounted in a pulley of the type shown in FIG. 1, the pulley was mounted to a bearing rotator, and the bearing outer ring was rotated at 10000 rpm under a 980N radial load at an ambient temperature of 150° C. The grease life was determined by measuring the time until the grease degrades to such a degree that the bearing torque increases excessively and the bearing temperature reaches 200° C. The test results are shown in Tables 1 and 3.

As will be apparent from the results of Tables 1 and 3, Examples 1–3, which satisfy all the requirements, were low in the bearing torque at 170–180 gf.cm and low in the degree of oil separation too. In the cold-time noise test ①, no noise was heard. The grease life was long at 350–430 hours.

In contrast, for Comparative Examples 1–4, which contain ester oils other than the predetermined ester oil in the base oil, the bearing torque was high and unstable at 63–430, and the grease life was short, i.e. 150 hours or less, when used at high temperatures. The degree of oil separation was high compared with Examples of the invention. For Comparative Example 5, in which the base oil contains the predetermined ester oil but its content exceeds the predetermined range, and for Comparative Example 6, in which the content of the predetermined ester oil is below the predetermined range, the grease life was short, i.e. 120 hours at high temperatures (150° C.), though no cold-time noise was heard.

As will be apparent from the results of Table 4, the grease of the Example 1, which satisfies all the requirements, was able to completely muffle noise when used in a bearing with a 0.02 mm clearance. Also, when the same grease was used in a bearing with no clearance, this bearing scarcely produced noise, i.e. at a rate of mere 20%.

Under the same conditions as Example 1, the grease of Comparative Example 1 produced noise at high rates, i.e. 49–75%.

According to this invention, as described above, a synthetic hydrocarbon oil and an ester synthetic oil having a specific molecular chain structure are used in combination, with a urea thickening agent further added thereto. Such grease reveals excellent lubricating properties within a wide temperature range from low to high. At low temperatures, i.e. immediately after the engine is started, no noise is produced. Its high-temperature durability is maintained for a long time, so that it can prolong the life of the bearing.

This grease is especially suited for use as a grease to be sealed in ball bearings for supporting a pulley for engaging belts for transmitting automotive engine torque.

TABLE 1

| Material and test result | Number | Examples | | |
|---|---|---|---|---|
| | | 1 | 2 | 3 |
| Weight ratio of base oil | PAO-a (1) | 0.70 | 0.65 | 0.75 |
| | Ester oil-1 (4) | 0.30 | 0.35 | 0.25 |
| Viscosity of base oil (40° C.) | | 40.6 | 44.0 | 35.0 |
| Contents (wt %) | Base oil | 83 | 83 | 83 |
| | Urea | 12 | 12 | 12 |
| Consistency | (a) | 243 | 244 | 240 |
| Oil separation (wt %) | (b) | 0.7 | 0.8 | 0.7 |
| Bearing torque (gf cm) | (c) | 180 | 170 | 171 |
| Noise at cold state | (d₁) | No | No | No |
| Result of rust test | (e) | 0 | 0 | 0 |
| Grease life (h) | (f) | 400 | 430 | 350 |

TABLE 2

| Material | Number | Comparative examples | | | | | |
|---|---|---|---|---|---|---|---|
| | | 1 | 2 | 3 | 4 | 5 | 6 |
| Weight ratio of base oil | | | | | | | |
| PAO-a | (1) | — | — | — | — | 0.60 | 0.90 |
| PAO-b | (2) | — | 1 | — | — | — | — |
| PAO-c | (3) | — | — | 1 | — | — | — |
| Ester oil-1 | (4) | — | — | — | — | 0.40 | 0.10 |
| Ester oil-2 | (5) | — | — | — | 1 | — | — |
| Mineral oil | (6) | 1 | — | — | — | — | — |
| Viscosity of base oil (40° C.) | | 95.0 | 30.5 | 46.0 | 26.0 | 47.4 | 33.6 |

TABLE 2-continued

| | | Comparative examples | | | | | |
|---|---|---|---|---|---|---|---|
| Material | Number | 1 | 2 | 3 | 4 | 5 | 6 |
| Contents (wt %) | | | | | | | |
| Base oil | | 83 | 83 | 83 | 83 | 83 | 83 |
| Urea | (8) | 12 | 12 | 12 | — | 12 | 12 |
| Li soap | (9) | — | — | — | 12 | — | — |

TABLE 3

| | | Examples | | | | | |
|---|---|---|---|---|---|---|---|
| Test item | Number | 1 | 2 | 3 | 4 | 5 | 6 |
| Consistency | (a) | 280 | 299 | 243 | 250 | 239 | 240 |
| Oil separation (wt %) | (b) | 1.6 | 1.6 | 1.6 | 1.5 | 0.5 | 0.6 |
| Bearing torque (gf cm) | (c) | 170 | 210 | 430 | 157 | 63 | 70 |
| Noise at cold state | (d$_2$) | Yes | No | No | Yes | No | No |
| Grease life (h) | (f) | 80 | 130 | 150 | 70 | 120 | 120 |

TABLE 4

| Result of cold test (d$_2$) | | |
|---|---|---|
| | Rate of nose at cold state | |
| Number | Bearing gap (0.02) | Bearing gap (0) |
| Comparative example 1 | 30/40 (75%) | 49/100 (49%) |
| Example 1 | 0/70 (0%) | 14/70 (20%) |

What is claimed is:

1. A grease to be sealed in a bearing comprising a base oil and 5–20 weight % of an urea thickening agent, said base oil comprising a synthetic hydrocarbon oil and an ester synthetic oil in a weight ratio of 0.65–0.75:0.35–0.25, respectively, said ester synthetic oil comprising oil chain molecules, said oil chain molecule comprising a carbon atom chain of at least eight carbon atoms having bonded thereto at least eight ester groups arranged on only one side of said carbon atom chain.

2. The grease as claimed in claim 1 wherein said ester synthetic oil is expressed by the formula of:

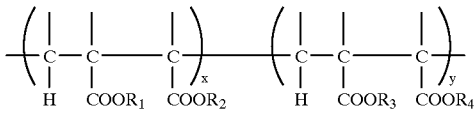

wherein $R_1$–$R_4$ are alkyl groups, and x and y are integers greater than 1.

3. The grease as claimed in claims 2 or 1, further comprising an extreme pressure agent of dithiophosphate in an amount of 0.1–10 wt %.

4. The grease as claimed in claim 3 wherein said dithiophosphate is zinc dithiophosphate.

5. A method of using the grease of claim 1 comprising sealing said grease in a ball bearing to support a pulley engaging belt for transmitting automotive engine torque.

6. A method of using the grease of claim 2 comprising sealing said grease in a ball bearing to support a pulley engaging belt for transmitting automotive engine torque.

7. A method of using the grease of claim 3 comprising sealing said grease in a ball bearing to support a pulley engaging belt for transmitting automotive engine torque.

8. A method of using the grease of claim 4 comprising sealing said grease in a ball bearing to support a pulley engaging belt for transmitting automotive engine torque.

* * * * *